Jan. 17, 1967   C. C. GAMBILL   3,299,346
HALF-WAVE VOLTAGE CONTROL SYSTEM FOR HEATING LOADS
Filed April 29, 1963
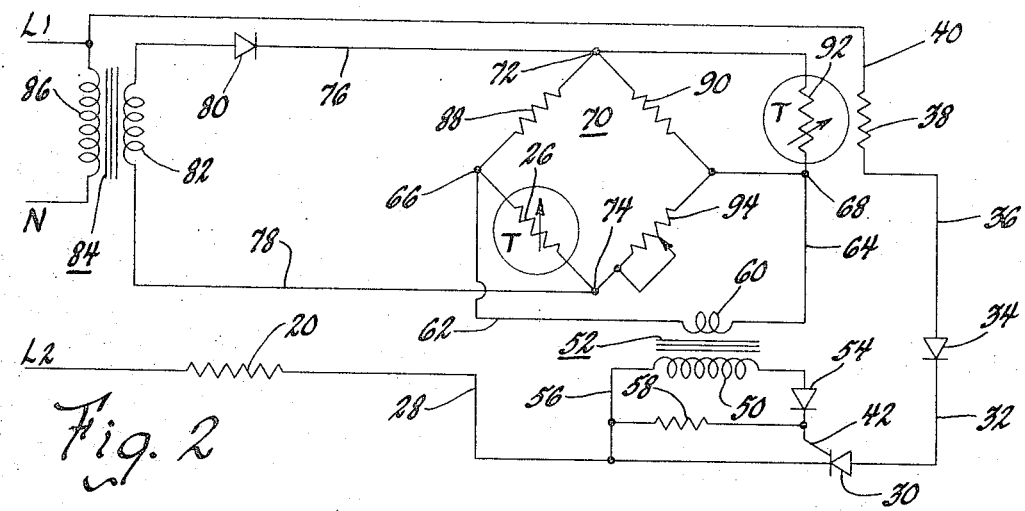
Fig. 2
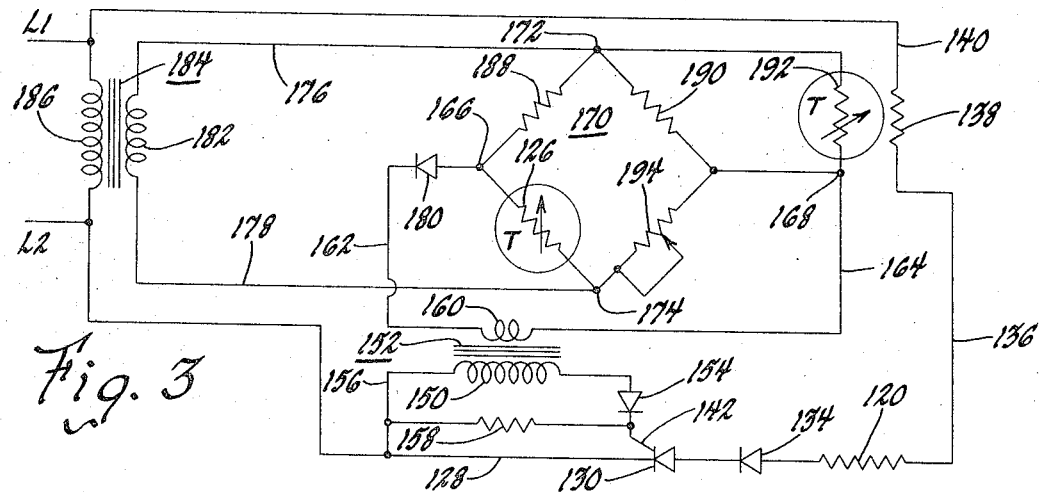
Fig. 3
Fig. 1
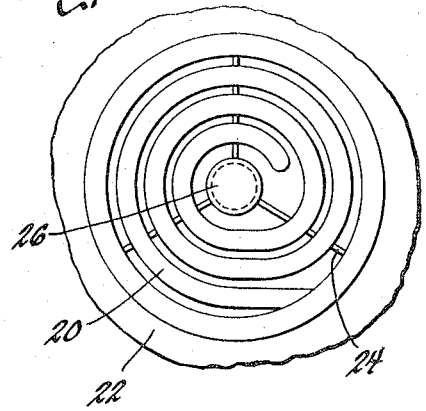
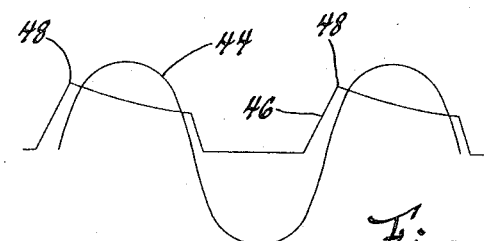
Fig. 4
INVENTOR.
Charles C. Gambill
BY
Carl A. Stickel
HIS ATTORNEY 3,299,346
HALF-WAVE VOLTAGE CONTROL SYSTEM
FOR HEATING LOADS
Charles C. Gambill, Tipp City, Ohio, assignor to General Motors Corporation, Detroit, Mich., a corporation of Delaware
Filed Apr. 29, 1963, Ser. No. 276,584
6 Claims. (Cl. 323—22)

This invention pertains to electrical apparatus and more particularly to means for controlling an electrical load with a minimum of radio interference.

It has been proposed to control the semiconductor control devices in alternating current phase control circuits by varying the phase angle at which the peak voltage is applied. I have found that such circuits cause objectionable radio interference and, therefore, may not be used in many localities.

It is an object of my invention to provide a suitable, simple, electrical, semiconductor control system for an electrical load which is accurate, inexpensive and free of radio interference.

It is another object of my invention to provide a suitable, simple, electrical, semiconductor control system for an electrical load which controls by either conducting or failing to conduct for one or more substantially complete half cycles.

It is another object of my invention to provide a suitable, simple, electrical, semiconductor control system for an electrical load which applies a peak voltage triggering signal to the semiconductor substantially at the time the voltage applied to it passes through zero.

It is another object of my invention to provide a suitable, simple, alternating current, electrical, semiconductor control system for an electrical load which applies a peak voltage triggering signal to the semiconductor substantially at the time the voltage applied to it passes through zero at the beginning of each alternate half cycle and which controls the conduction throughout each alternate half cycle by controlling the amplification of the peak voltage.

These and other objects are attained in the form shown in the drawings in which the electrical load is represented as an electrical resistance incorporated in the sheathed tubular type of surface heater commonly found on an electrical range. A step-down transformer supplies current to a bridge circuit having in one of its legs a thermistor which is incorporated in a spring mounted contact member in the center of the surface heater. This spring mounted member is adapted to contact the bottom of a pan or utensil upon the heater. An adjustable potentiometer and an anticipating thermistor are incorporated in other legs of the bridge circuit. When the temperature of the sensing thermistor is below the temperature selected by the adjustable potentiometer, the bridge circuit is unbalanced and delivers its output to a step-up transformer which applies a rectified peak voltage triggering signal to the gate of a silicon controlled rectifier substantially at the beginning of each alternate half cycle. When this peak voltage is sufficient, it will cause the silicon controlled rectifier to conduct and allow current flow through the electrical load. When the unbalance in the bridge circuit is reduced substantially to a minimum and when the sensing thermistor substantially reaches the selected temperature, the peak voltage will not be sufficient to trigger the silicon controlled rectifier so that the electrical load is de-energized as long as the substantial balance in the bridge circuit prevails.

Further objects and advantages of the present invention will be apparent from the following description, reference being had to the accompanying drawings wherein preferred embodiments of the present invention are clearly shown.

In the drawings:

FIGURE 1 is a top view of a surface heater of an electric range embodying one form of my invention;

FIGURE 2 is a wiring diagram for the surface heater shown in FIGURE 1;

FIGURE 3 is a slightly modified form of wiring diagram for the surface heater shown in FIGURE 1; and FIGURE 4 is a time-voltage graph illustrating the alternating current applied to the silicon controlled rectifier at its anode and cathode terminals and also at its gate.

Referring now to the drawings and more particularly to FIGURE 1, there is shown a surface heater 20 for an electric range 22 supported upon the three-arm support 24 which also through a spring mounting supports a contact member incorporating a sensing thermistor 26 which is held against the bottom of the pan or utensil resting on the surface heater 20 by reason of the spring mounting. The sensing thermistor 26 has a resistance of 3500 ohms at 77° F. which reduces to 40 ohms at 500° F. The surface heater 20 has one terminal connected to the supply conductor $L_2$ and a second terminal connected through the conductor 28 to the cathode electrode of a silicon controlled rectifier 30. This silicon controlled rectifier, for example, may be a type 2N688. The anode electrode of the silicon controlled rectifier 30 is connected through the conductor 32 and a diode rectifier 34 as well as the conductor 36 of an anticipating thermistor heater 38 and a conductor 40 to the supply conductor $L_1$. Previously, in the use of semiconductor control devices for electric loads, regulation has been affected by changing the phase angle so as to make the semiconductor conductive for the latter portion of each sine wave in a varying amount which varies according to the phase angle. While this system accomplishes regulation, it also creates a very objectionable form of radio interference so that such a system cannot be used in many localities.

According to my invention, I provide a modulating control substantially without the radio interference by controlling the semiconductor, such as the silicon controlled rectifier 30, so that it will conduct complete half cycles and, then for modulation it will not conduct during other complete half cycles. This is accomplished by applying to the gate electrode 42 of the silicon controlled rectifier 30 a peak voltage substantially at the beginning of the half cycle. When this peak voltage is below the minimum required to cause the rectifier to conduct, there will be no conduction through that half cycle. However, when the peak voltage is high enough to cause the rectifier 30 to conduct, then the rectifier will conduct for the complete half cycle. This is illustrated in FIGURE 4 in which a conventional, alternating voltage, sine wave 44 resulting from the application of alternating current to the supply conductors $L_1$ and $L_2$ is shown coordinated in time with the voltage curve 46 showing the application of a peak voltage 48 substantially at the beginning of the positive swing of each of the half cycles of the alternating current, voltage curve 44.

To accomplish this, the secondary 50 of a step-up transformer 52 is connected through a diode rectifier 54 to the gate 42 of the silicon controlled rectifier 30. The second terminal of the secondary winding 50 is connected by the conductor 56 to the conductor 28 which connects to the cathode of the rectifier 30. To prevent the application of excessive voltage to the gate 42, there is connected a resistor 58 between the gate 42 and the conductor 56. The step-up transformer 52 may have its winding turns, for example, in a ratio of one to eight.

The primary winding 60 of this transformer 52 has its terminals connected by the conductors 62 and 64 to the output terminals 66 and 68 of a bridge circuit 70. The bridge circuit 70 has its input terminals 72 and 74 connected by the conductors 76 and 78 through a diode rectifier 80 to the terminals of the secondary winding 82 of a transformer 84. This transformer 84 is a step-down transformer and has its windings approximately in the ratio of eight to one. The primary winding 86 of this transformer 84 has its terminals connected between the supply conductor $L_1$ and neutral conductor N.

In the bridge circuit 70, fixed resistances 88 and 90 connect the input terminal 72 with the output terminals 66 and 68. An anticipating thermistor 92 is located in heat transfer relationship with the anticipating heater 38 and is connected in shunt circuit with the fixed resistance 90 so as to reduce the unbalance of the bridge as the thermistor 92 is being slowly heated by the anticipating heater 38 during the heating of the heater 20. The sensing thermistor 26 is connected between the output terminal 66 and the input terminal 74. An adjustable potentiometer 94 is connected between the input terminal 74 and the output terminal 68. It has a maximum value of 1000 ohms.

The preponderantly inductive step-down, step-up transformer and rectifier arrangement including the bridge 70 by the application of rectified half wave current to the input winding of the transformer 52 and the non-ideal transformer characteristics provides the peak voltage 48 at the proper time in coordination with the alternating current sine wave 44 as illustrated in FIGURE 4. When the unbalance in bridge circuit 70 is sufficient, the voltage peak 48 will be raised high enough to cause the silicon controlled rectifier to conduct and provide a flow of complete half wave pulses through the heater 20 without any substantial radio interference. This will continue until the bridge circuit 70 achieves substantial balance. When substantial balance is reached, the peak voltage 48 at the gate 42 will be insufficient to cause the silicon controlled rectifier 30 to conduct so that the flow of current through the heater 20 will be prevented until the bridge circuit 70 again becomes unbalanced due to the fact that the thermistor 26 is below the temperature set by the potentiometer 94. The temperature level to be maintained is provided by a suitable temperature scale coordinated with the adjustment provisions of the potentiometer 94. While I have described the invention as applied to an electric heater 20, it is possible to apply this circuit to other electrical loads.

In the form shown in FIGURE 3, the principal difference is that the diode rectifier corresponding to the rectifier 80 is placed in the output circuit of the bridge circuit instead of in the input of the bridge circuit. In this circuit the primary 186 of the step-down transformer 184 is connected directly across the supply conductors $L_1$ and $L_2$. The secondary winding 182 of this transformer is connected by the conductors 176 and 178 to the input terminals 172 and 174 of the bridge circuit 170. The output terminal 166 is connected through the diode rectifier 180 and the conductor 162 to one terminal of the primary winding 160 of the step-up transformer 152. The second output terminal 168 of the bridge circuit 170 is connected by the conductor 164 to the other terminal of the transformer winding 160. Between the input terminal 172 and the output terminal 166 is a fixed resistance 188 while between the input terminal 172 and the output terminal 168 is the fixed resistance 190. The anticipating thermistor 192 is connected in shunt with the fixed resistance 190.

One terminal of the secondary winding 150 of the step-up transformer 152 is connected through the diode rectifier 154 to the gate 142 of the silicon controlled rectifier 130. This rectifier may be the type 2N688. The second terminal of the secondary winding 150 is connected by the conductor 156 to the conductor 128 connecting the supply conductor $L_2$ with the cathode of the silicon controlled rectifier 130. To limit the voltage applied to the gate 142, there is connected between the gate 142 and the conductor 156 a fixed resistance 158. The anode of the silicon controlled rectifier 130 is connected through a diode rectifier 134 to the electrical load 120 in the form of an electric surface heater which is connected through a conductor 136 and a 2/100 ohm anticipating heater 138 and a conductor 140 to the supply conductor $L_1$. The step-down, step-up transformer and rectifier circuit with the bridge circuit in between applies a peak voltage to the gate 142 similar to the curve 46 in FIGURE 4. When the bridge circuit 170 is unbalanced due to the temperature of the thermistor 126 connected between the terminals 166 and 174 being less than the temperature selected by the potentiometer 194, the bridge circuit will be unbalanced and produce a voltage curve with peaks similar to 48 high enough to cause the silicon controlled rectifier 130 to conduct for complete half cycles of the alternating current. This continues until the temperature of the thermistor 126 is increased high enough to cause the bridge circuit 170 to become substantially balanced, thereby lowering the voltage peak similar to 48 until the silicon controlled rectifier 130 no longer conducts. This prevents the heater and the pan or utensil from rising above the temperature selected by the adjustable potentiometer 194. The anticipating heater 138 in heat transfer relation with the anticipating thermistor 192 tends to gradually reduce the unbalance of the bridge 170 to prevent overshooting of the selected temperature due to the heat stored in the electric heater 20. This circuit likewise substantially prevents radio interference and may be applied to other electrical loads.

While the embodiments of the present invention as herein disclosed constitute preferred forms, it is to be understood that other forms might be adopted.

What is claimed is as follows:

1. In combination, an electrical load, alternating current supply means electrically connected to said electrical load, a semi-conductor control means having electrodes connected in series with said electrical load, preponderantly inductive circuit means between said supply means and said electrodes for repeatedly applying to said electrodes a peak voltage substantially at the time in the application of the alternating current sine wave to the control means when the voltage passes through zero comprising a first transformer having input terminal means electrically connected to said supply means and having output terminal means, a control bridge circuit having input terminal means connected to said output terminal means and having output terminal means, one of said terminal means having a diode rectifier connected in series with it, a second transformer having input terminal means connected to the output terminal means of said bridge circuit and having output terminal means connected to two electrodes of said semiconductor control means, and a diode electrically connected in series with the output terminal means of said second transformer.

2. In combination, an electrical load, alternating current supply means electrically connected to said electrical load, a silicon controlled rectifier connected in series with said electrical load and having anode and cathode electrodes and a gate, preponderantly inductive circuit means between said supply means and said gate for repeatedly applying to said gate a peak voltage substantially at the time in the application of the alternating current sine wave to the control means when the voltage passes through zero comprising a first transformer having input terminal means electrically connected to said supply means and having output terminal means, a control bridge circuit having input terminal means connected to said output terminal means and having output terminal means, one of said terminal means having a diode rectifier connected in series with it, a second transformer having input terminal means connected to the output terminal means of said bridge circuit and having output terminal means connected to said gate and one of said electrodes for controlling said silicon controlled rectifier, said output terminal means of said second transformer having a diode rectifier connected in series with it.

3. A combination as defined in claim 1 in which the load is a heat dissipating load and in which said control bridge circuit comprises a temperature responsive resistance located in heat transfer relation with said load.

4. A combination as defined in claim 1 in which the load is a heat dissipating load and in which said control bridge circuit comprises a manually variable resistance and a temperature responsive resistance located in heat transfer relation with said load.

5. A combination as defined in claim 1 in which the bridge circuit comprises current flow varying means responsive to current flow through said load.

6. A combination as defined in claim 2 in which the bridge circuit comprises a temperature responsive resistance for varying current flow to an input terminal means of said second transformer and an anticipating heater is connected in series with said silicon controlled rectifier and in heat transfer relation with said temperature responsive resistance.

References Cited by the Examiner
UNITED STATES PATENTS

| | | | |
|---|---|---|---|
| 2,998,547 | 8/1961 | Berman | 315—200 |
| 3,051,813 | 8/1962 | Busch et al. | 219—489 |
| 3,175,076 | 3/1965 | Fox et al. | 219—494 |
| 3,175,077 | 3/1965 | Fox et al. | 219—494 |
| 3,196,255 | 7/1965 | Beauchamp et al. | 219—497 |

JOHN F. COUCH, *Primary Examiner.*

W. E. RAY, *Assistant Examiner.*